United States Patent
Aono

(10) Patent No.: US 8,290,373 B2
(45) Date of Patent: Oct. 16, 2012

(54) WAVELENGTH DIVISION MULTIPLEXER AND REGENERATIVE REPEATING METHOD IN WAVELENGTH DIVISION MULTIPLEXING NETWORK

(75) Inventor: Yoshiaki Aono, Tokyo (JP)

(73) Assignee: NEC Corporation, Tokyo (JP)

( * ) Notice: Subject to any disclaimer, the term of this patent is extended or adjusted under 35 U.S.C. 154(b) by 513 days.

(21) Appl. No.: 12/536,785

(22) Filed: Aug. 6, 2009

(65) Prior Publication Data

US 2010/0034533 A1   Feb. 11, 2010

(30) Foreign Application Priority Data

Aug. 7, 2008   (JP) .................... 2008-204603

(51) Int. Cl.
*H04B 10/00* (2006.01)
*H04J 14/00* (2006.01)
(52) U.S. Cl. ........................................ 398/135
(58) Field of Classification Search ........... 398/56, 398/135, 137
See application file for complete search history.

(56) References Cited

U.S. PATENT DOCUMENTS

| | | | |
|---|---|---|---|
| 6,876,651 B1 * | 4/2005 | Grohn | 370/375 |
| 6,996,123 B1 * | 2/2006 | Jiang et al. | 370/465 |
| 2004/0071389 A1 * | 4/2004 | Hofmeister et al. | 385/16 |
| 2004/0165888 A1 * | 8/2004 | Gerstel et al. | 398/45 |
| 2006/0133803 A1 | 6/2006 | Tian et al. | |
| 2008/0175587 A1 * | 7/2008 | Jensen | 398/2 |

FOREIGN PATENT DOCUMENTS

| | | |
|---|---|---|
| JP | 2007503188 A | 2/2007 |
| JP | 2007506317 A | 3/2007 |
| JP | 2007208591 A | 8/2007 |

OTHER PUBLICATIONS

L. Velasco et al., "ROADM design for OMS-DPRing protection in GMPLS-based optical networks", Design and Reliable Communication Networks, 2007. 6th International Workshop on, IEEE, Oct. 7, 2007, pp. 1-7, XP031412791.

O. Gerstel et al., "Fault Tolerant Multiwavelength Optical Rings with Limited Wavelength Conversion", IEEE Journal on Selected Areas in Communications, vol. 16, No. 7. Sep. 1, 1998, pp. 1166-1178, XP011054823.

* cited by examiner

*Primary Examiner* — Nathan Curs

(57) ABSTRACT

Disclosed is transponder (optical transmitter/receiver) that has a switch, which switches on and off the loopback of an optical path, to allow the same transponder to implement the transmission/reception end function on an optical path, and the regenerative repeating function at an intermediate point on an optical path. When a new optical path is built, the assignment of the wavelength and the allocation of the incoming and outgoing paths for transmission/reception are set remotely.

12 Claims, 4 Drawing Sheets

WAVELENGTH DIVISION MULTIPLEXER AND REGENERATIVE REPEATING METHOD IN WAVELENGTH DIVISION MULTIPLEXING NETWORK

This application is based upon and claims the benefit of the priority of Japanese patent application No. 2008-204603, filed on Aug. 7, 2008, the disclosure of which is incorporated herein in its entirety by reference thereto.

FIELD OF THE INVENTION

The present invention relates to a wavelength division multiplexer, and more particularly to a regenerative repeating method and a regenerative repeating apparatus for use in a wavelength division multiplexing network.

BACKGROUND

In a WDM (Wavelength Division Multiplexing) network system, a transponder comprises an optical-to-electrical converter (O/E) that receives an optical signal and converts it to an electrical signal and an electrical-to-optical converter (E/O) that receives an electrical signal and converts it to an optical signal. A signal transferred to the transponder is subjected to the optical-to-electrical conversion and electrical-to-optical conversion. Because separate transponders have been used for transmission/reception and for regenerative repeating, the cost of a standby transponder is high. In addition, when an optical path failure occurs and the path must be switched, a bypass path used for switching must be located near enough to eliminate the need for regenerative repeating by an intermediate WDM apparatus (must be located relatively near).

Patent Document 1 discloses the configuration of an optical cross-connect apparatus having a wavelength conversion repeater capable of converting the wavelength of a signal to an arbitrary wavelength. This optical cross-connect apparatus, in which a standby wavelength conversion repeater is shared by multiple working paths, works as an apparatus having the failure recovery function via in-channel control at network failure time and variably controls the path switching and the usage wavelength setting according to an instruction from the network management apparatus.

Patent Document 2 discloses the configuration of a transponder in which an optical switch is provided between each transponder and a related transponder and the optical switch selectively terminates the signal from the related transponder or transfers the signal to the related transponder. Patent Document 3 discloses the configuration of a transponder that has both the transmission/reception function and the regenerative repeating function.

[Patent Document 1] Japanese Patent Kokai Publication No. JP-P2007-208591A
[Patent Document 2] Japanese Patent Kohyo Publication No. JP-P2007-503186A
[Patent Document 3] Japanese Patent Kohyo Publication No. JP-P2007-506317A The disclosures of the above Patent Documents 1 to 3 are incorporated herein by reference thereto.

The following gives the analysis of the related technology of the present invention.

In a WDM system, two types of transponders are used, one for a transmission/reception end and the other for regenerative repeating. This means that separate transponders must be prepared for use in exchanging transponders when a transponder fails. Another problem is that, once a predetermined wavelength and an incoming/outgoing path for a transmission/reception route are set up for a transponder, the setting cannot be remotely changed to the setting for another usage condition. Therefore, building a new optical path requires onsite installation work.

In the configuration disclosed in Patent Document 1 where the path switching and usage wavelength setting are variably controlled by an instruction from the network management apparatus, dedicated transponders are provided for regenerative repeating and add/drop multiplexing. In the configuration disclosed in Patent Document 2, the optical switches installed externally to a transponder, which are controlled by optical signals, are costly. In the configuration disclosed in Patent Document 3, the transponder does not have the line termination function.

SUMMARY

Accordingly, it is an object of the present invention to provide an apparatus, system, and method in which one transponder has both the transmission/reception end function and the regenerative repeating function and, in addition, the wavelength and the incoming and outgoing paths for transmission/reception route can be set remotely.

The invention disclosed by this application provides the following general configuration.

According to one aspect of the present invention, there is provided a transponder comprising an optical line termination function; and a means that switches between a transmission/reception end function and a regenerative repeating function by looping back a received signal.

In the present invention, it is also possible to configure the transponder in such a way the transponder functions as a reception end and controls multicasting by looping back, and regenerating and repeating, the same signal as a signal received by the reception end.

In the present invention, the transponder may comprise a switch unit that switches a connection state between a first connection state in which the transponder functions as a transmission end where a signal, output from a client apparatus, is received in a form of an optical signal, the received signal is converted to an electrical signal and then to an optical signal, and the converted signal is output to an input of a WDM (Wavelength Division Multiplexing) apparatus and, in addition, functions as a reception end where a signal, output from the WDM apparatus, is received in a form of an optical signal, the received signal is converted to an electrical signal and then to an optical signal, and the converted signal is output to an input of the client apparatus; and a second connection state in which a signal, output from the WDM apparatus, is received in a form of an optical signal, the received signal is converted to an electrical signal and looped back and, after that, the looped back signal is converted to an optical signal and the converted signal is output to an input of the WDM apparatus.

In the present invention, the switch unit is capable of switching the connection state to a third connection state in which the transponder functions as a reception end where an optical signal, output from the WDM apparatus, is received and the received signal is output to the client apparatus as an optical signal and, at the same time, receives an optical signal, output from the WDM apparatus, loops back the received signal, and outputs the looped-back signal to the WDM apparatus as an optical signal.

In the present invention, the transponder may comprise:

a first optical-to-electrical converter (21) that receives an optical signal, output from the client apparatus (1), and converts the received signal to an electrical signal;

a transmission unit (24) that receives the electrical signal, output from the first optical-to-electrical converter (21), and produces a transmission signal for an optical transmission network;

a first electrical-to-optical converter (26) that converts the transmission signal, which is an electrical signal output from the transmission unit (24), to an optical signal and outputs the converted optical signal to an input of a WDM (Wavelength Division Multiplexing) apparatus (3);

a second optical-to-electrical converter (27) that receives an optical signal, output from the WDM apparatus (3), and converts the received optical signal to an electrical signal;

a reception unit (25) that receives the electrical signal, output from the second optical-to-electrical converter (27), and produces a received signal;

a second electrical-to-optical converter (22) that converts the received signal, output from the reception unit (25), to an optical signal and outputs the converted optical signal to an input of the client apparatus (1); and a switch unit (23) that performs switch control between a connection state in which the output of the reception unit (25) is loop-back connected to the input of the transmission unit (24); and a connection state in which the output of the first optical-to-electrical converter (21) is connected to the input of the transmission unit (24) and the output of the reception unit (25) is connected to the input of the second electrical-to-optical converter (22). It should be noted that the reference numerals in parentheses are added to make it easy to understand the configuration of the present invention and that they do not limit the present invention.

In the present invention, the WDM apparatus includes an optical switch, and the optical switch, together with the transponder, configures a WDM node connected to a WDM network.

In the present invention, the switching of the switch unit may be set remotely via the WDM network.

In the present invention, a node connected to the WDM network comprises the transponder. In the present invention, the transponder, which is connected to a client apparatus and has been functioning as a transmission/reception end, has a function thereof switched to a regenerative repeating function when a failure occurs on a path to which the node is connected, and is connected to a path, other than the path on which the failure occurred, by the optical switch function in the node.

In the present invention, a node apparatus may comprise the transponder of the present invention between an optical switch, which switches paths among WDM transmission lines, and a client apparatus as a redundant configuration comprising a working transponder and a standby transponder. Out of the transponders in the redundant configuration, the working transponder is connected to the client apparatus via a change-over switch. In the present invention, the standby transponder may function as a transponder for regenerative repeating.

In the present invention, there is provided a method wherein, in a node connected to a WDM network, one transponder is made switchable between a transmission/reception end function and a regenerative repeating function and, when a failure occurs on a path to which one node is connected, a transponder that has been functioning in the one node as a transmission/reception end has a function thereof switched to the regenerative repeating function, and is connected to a path, other than the path on which the failure occurred, by an optical switch function in the WDM node.

In the present invention, the transponders may be provided redundantly in a node connected to the WDM network, and a working transponder may be connected to a client apparatus via a change-over switch. In the present invention, a standby (non-working) transponder may be made to function as a transponder for regenerative repeating.

The meritorious effects of the present invention are summarized as follows.

The present invention implements the transmission/reception end function and the regenerative repeating function by the same transponder and allows the operator to remotely set wavelengths and incoming and outgoing paths for transmission/reception.

The present invention described above reduces cost of the equipment investment in a standby transponder and removes restriction on distance of a bypass path.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

In the present invention, a transponder (optical transmitter/receiver) used in a WDM system has a switch that changes over between on (connection) and off (disconnection) of the loop back of an optical path to allow the same transponder to perform the transmission/reception end function on an optical path and the regenerative repeating function at an intermediate point on an optical path. In the present invention, when a new optical path is built, the wavelength assignment and the transmission/reception route allocation are set remotely.

In the present invention, a transponder has a switch (23) that switches loopback function for looping back and transmitting a received optical signal to allow the transponder to be switched remotely between the transmission/reception function.

In addition, using a control signal (monitor signal) transmitted on a wavelength division multiplexing network, the wavelength and the incoming and outgoing paths for transmission/reception can be switched by remotely setting the optical switch and the transponder.

Those functions implemented by the present invention reduce the cost of a transponder by allowing functions to be shared by the transponder, reduce the operation manpower through remote setting, and reduce the time required for creating a new optical path.

In addition, the present invention allows a regenerative repeating transponder to be configured flexibly, thereby removing the restrictions on the distance of a bypass path. The ability to flexibly configure a regenerative repeating transponder on a bypass path, when a failure occurs, reduces the restrictions on a path search for the switching destination and enables the user to build a higher reliable WDM network. The following describes the present invention with reference to exemplary embodiments.

Figure 1A:
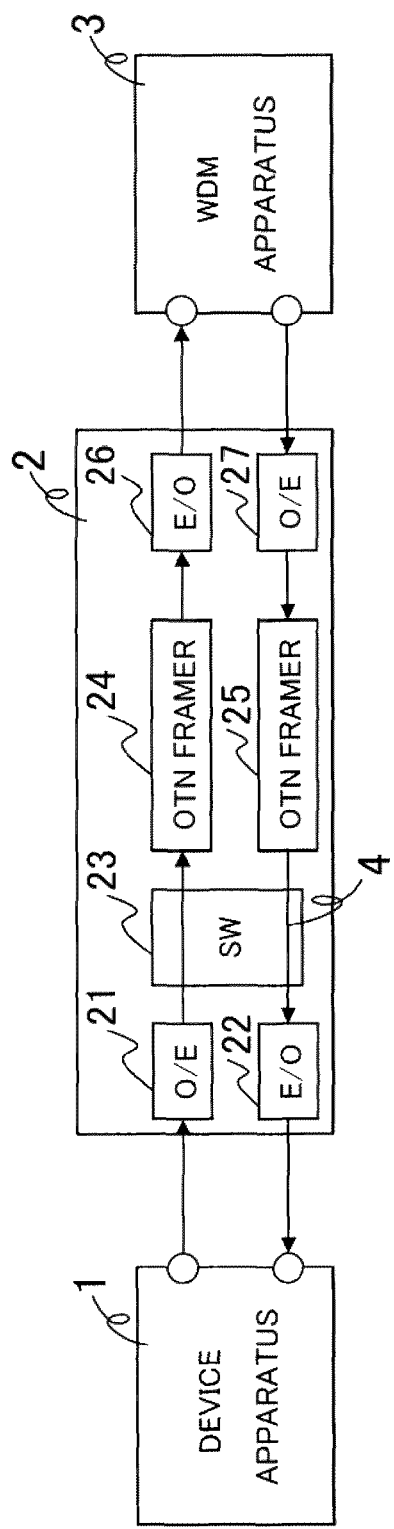
FIGS. 1A and 1B are diagrams showing the configuration of a transponder in one exemplary embodiment of the present invention.
Figure 1B:
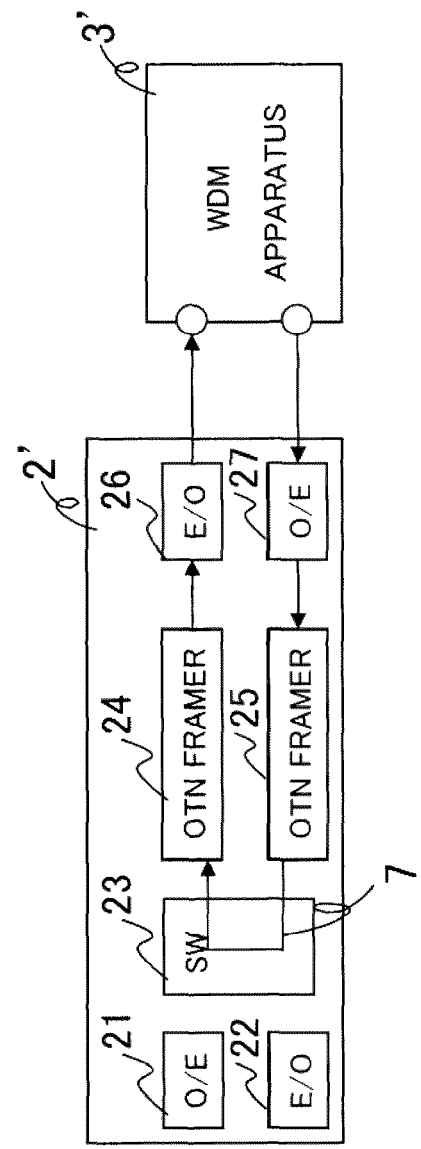

FIG. 1 is a diagram showing the configuration of a first exemplary embodiment of the present invention. FIG. 1A is a diagram showing the configuration of a transponder used for transmission and reception. FIG. 1B is a diagram showing the configuration of a transponder used as a regenerative repeater.

Referring to FIG. 1A, a transponder 2 connected between a WDM apparatus 3 and a client apparatus 1 comprises an optical-to-electrical converter (O/E) 21 that receives an optical signal from the client apparatus 1 and converts it to an electrical signal;

an OTN framer 24 (transmission unit) that creates a transmission frame for the OTN (Optical Transport Network);

an electrical-to-optical converter (E/O) 26 that converts the transmission frame of the electrical signal, received from the OTN framer 24, to an optical signal and transmits it to the input of the WDM apparatus 3;

an optical-to-electrical converter (O/E) 27 that receives an optical signal, output from the WDM apparatus 3, and converts it to an electrical signal;

an OTN framer 25 (receiving unit) that extracts the received signal from a reception frame for the OTN (Optical Transport Network);

an electrical-to-optical converter (E/O) 22 that converts the received signal in the form of the electrical signal, received from the OTN framer 25, to the optical signal; and transmits it to the input of the client apparatus 1; and a switch (SW) 23 that switches on/off the loopback connection between the output of the OTN framer 25 and the input of the OTN framer 24, the connection between the output of the optical-to-electrical converter (O/E) 21 and the input of the OTN framer 24, and the connection between the output of the OTN framer 25 and the input of the electrical-to-optical converter (E/O) 22.

Though not limited thereto, the OTN framer 24 performs processing such as overhead insertion, parity generation, scramble processing of generated frames, and Forward Error Correction (FEC). The OTN framer 25 performs processing such as descramble processing of an input frame, extraction of overhead information, interpretation of the frame alignment signal, and detection of an AIS (Alarm Indication Signal).

In the example shown in FIG. 1A, the switch (SW) 23 connects the output of the optical-to-electrical converter (O/E) 21 to the input of the OTN framer 24, connects the output of the OTN framer 25 to the input of the electrical-to-optical converter (E/O) 22, and turns off the connection (disconnects) between the output of the OTN framer 25 and the input of the OTN framer 24. The output from the WDM apparatus 3 is input to the client apparatus 1 via the optical-to-electrical converter (O/E) 27, OTN framer 25, switch 23, and electrical-to-optical converter (E/O) 22. The output signal from the client apparatus 1 is input to the WDM apparatus 3 via the optical-to-electrical converter (O/E) 21, switch 23, OTN framer 24, and electrical-to-optical converter (E/O) 26.

On the other hand, the switch 23 of a transponder 2' in FIG. 1B connects the output of the OTN framer 25 to the input of the OTN framer 24, turns off the connection between the output of the optical-to-electrical converter (O/E) 21 and the input of the OTN framer 24, and turns off the connection between the output of the OTN framer 25 and the input of the electrical-to-optical converter (E/O) 22. The optical signal output from the WDM apparatus 3' is looped back to the input of the WDM apparatus 3' through the path via the optical-to-electrical converter (O/E) 27, OTN framer 25, switch 23, OTN framer 24, and electrical-to-optical converter (E/O) 26.

In this exemplary embodiment, the transponder 2 for transmission/reception and the transponder 2' for generative repeating are implemented by the same hardware configuration, and the switching between a path 4 in FIG. 1A and a path 7 in FIG. 1B (that is, switching between the connection to and from the O/E (optical-to-electrical converter) 21 and E/O (electrical-to-optical converter) 22 on the client side and the connection between the OTN framers 24 and 25 on the other side) is changed by remote setting.

The transponder in this exemplary embodiment described above, is normally used as Add/Drop in a WDM apparatus and is used as a regenerative repeater by switching the function to the loopback function according to the importance of the line, for example, when a failure occurs.

Switching between the signal path 4 for the receiver setting and the path 7 for the regenerative repeater setting in the transponder is preferably carried out under software control to allow the operation to be performed remotely. For example, an operator logs into a corresponding WDM apparatus via an apparatus monitoring system (not shown), connected to the WDM network, for setting a desired setting condition.

Figure 2:
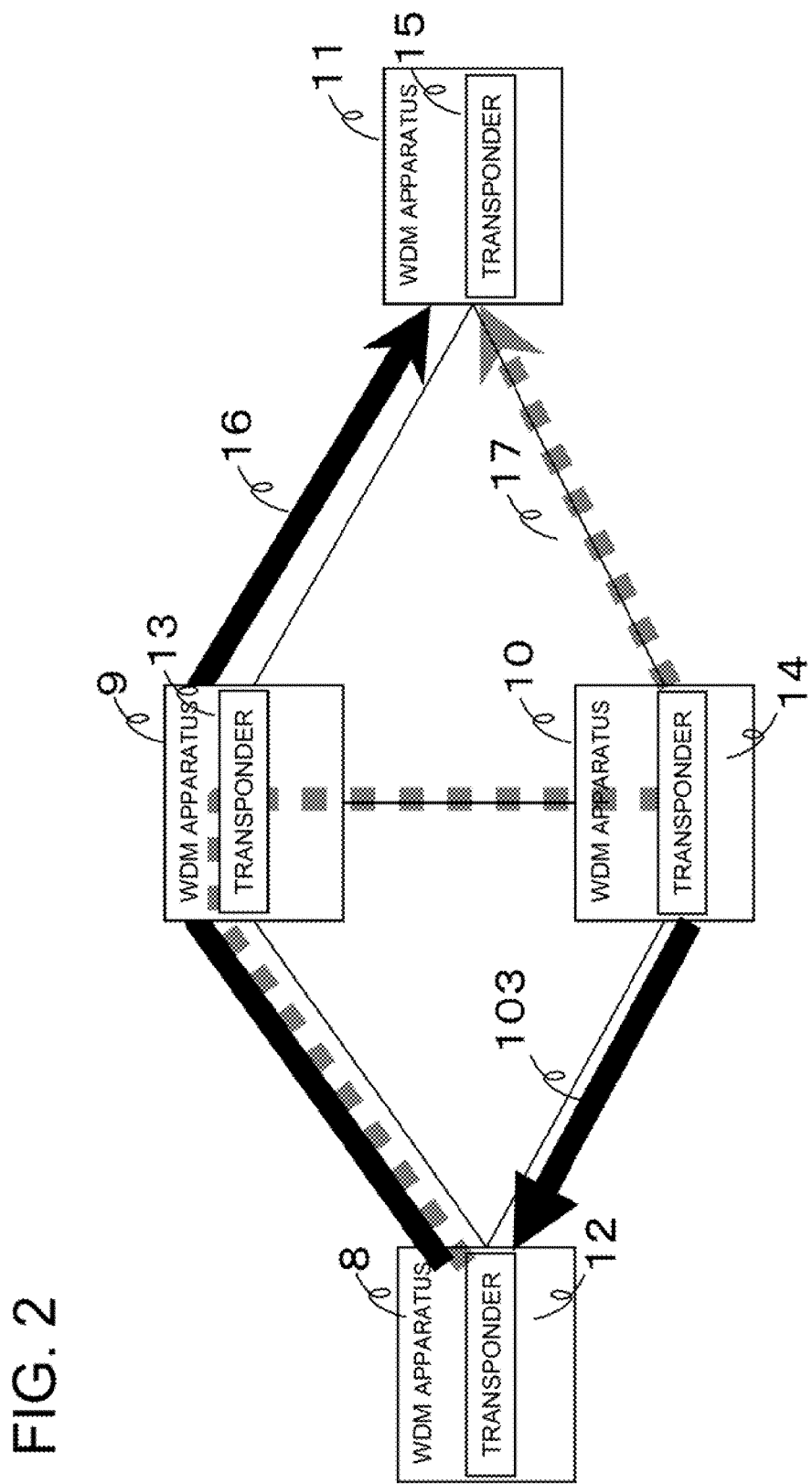
FIG. 2 is a diagram showing the configuration of transponders in one exemplary embodiment of the present invention.

FIG. 2 is a diagram showing an example of optical paths between a WDM apparatus 8 (node apparatus) and a WDM apparatus 11 (node apparatus) in a WDM network.

Referring to FIG. 2, an optical path is initially set up via a path 16 through the WDM apparatus 8, WDM apparatus 9, and WDM apparatus 11.

At this time, transponders 12 and 15 are used for transmission/reception such as the one shown in FIG. 1A, and a transponder 13 for regenerative repeating.

A transponder 14, which is installed in a WDM apparatus 10 as a standby transponder, is not connected to any path at this point in time.

In FIG. 2, assume that a failure (optical path disconnection) occurs in the optical connection part on a path 16 between the WDM apparatuses 9 and 11.

The path 16 is switched to a path 17 by the optical switch function in the WDM apparatuses 8, 9, 10, and 11. In this case, the transponder 14 is newly used for the regenerative repeating of the signal on the path 17.

Assume that, before being switched for use on the path 17, the transponder 14 is connected to a client apparatus (not shown) and forms the optical path of a path 103 between the WDM apparatus 10 and the WDM apparatus 8. If the importance of the optical path affected by the failure on the path 16 is higher than that of the optical path of the path 103, the signal is looped back via the path 7 by the switch 23 in the transponder 14 and the transponder 14 is used as a regenerative repeater to form the path 17.

Figure 3:
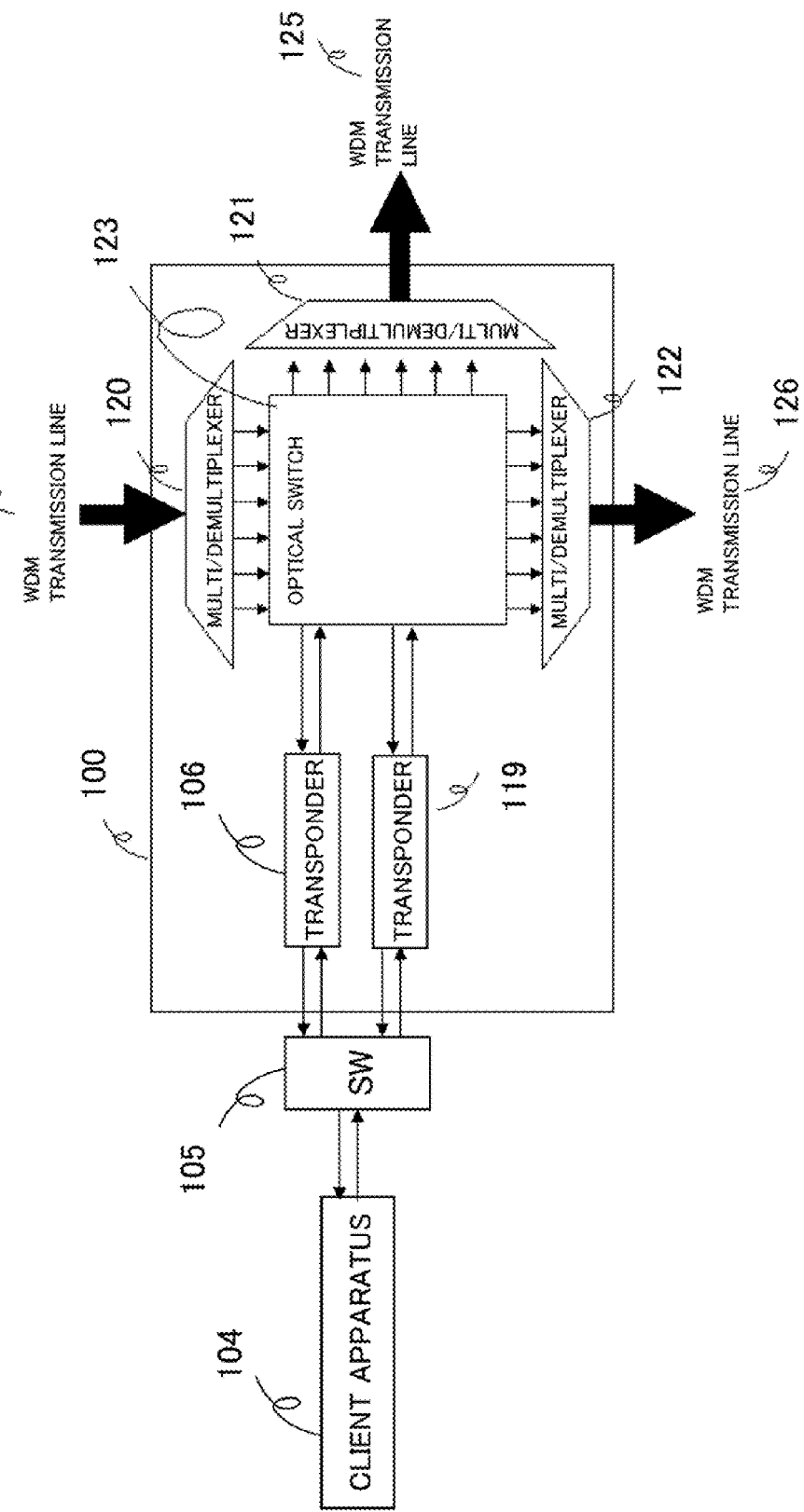
FIG. 3 is a diagram showing the configuration of the WDM apparatus in FIG. 2.

FIG. 3 is a diagram showing the configuration of one WDM apparatus shown in FIG. 2 (corresponds to a node apparatus in claims). Basically, the WDM apparatuses in FIG. 2 have the same configuration. A WDM apparatus 100 comprises transponders 106 and 119, a multi/demultiplexer 120 that receives signals from a WDM transmission line 124, an optical switch 123 that receives signals from the multi/demultiplexer 120, and multi/demultiplexers 121 and 122 that receive signals from the optical switch 123 and output them to WDM transmission lines 125 and 126.

The WDM apparatus has a redundant configuration in which the transponders 106 and 119 are provided and they are connected to a client apparatus 104 via a switch 105. The transponders 106 and 119 each have the configuration of the transponder 2(2') described above by referring to FIG. 1. In FIG. 3, the optical switch 123, to which the transponders 106 and 119 are connected, corresponds to the WDM apparatus 3(3') in FIG. 1.

During the normal operation, the transponder 119, which acts as a working transponder, is connected to the client apparatus 104 and, via the optical switch 123, connected to the WDM transmission line 125. When a failure occurs in the transponder 119, the switch 105 is switched to connect the transponder 106 to the client apparatus 104, and the optical switch 123 switches the connection between the transponder 119 and the WDM transmission line 125 to the connection between the transponder 106 and the WDM transmission line 125. In this way, the failure is recovered.

While there is no failure in the transponder 119, the standby transponder 106 may be used as a regenerative repeater from the WDM transmission line 124 to the WDM transmission line 126.

A signal received from the WDM transmission line 124 passes through the multi/demultiplexer 120 and the optical switch 123 and enters the transponder 119 for regenerative repeating. After the regenerative repeating, the signal passes through the optical switch 123 and is multiplexed (add) with other WDM signals by the multi/demultiplexer 121 and output to the WDM transmission line 125.

When a failure occurs ahead of the WDM transmission line 125 and the WDM transmission line must be changed to the WDM transmission line 126, the optical switch 123 switches the path.

Path switching in FIG. 2 is carried out in one of the following two ways; in one way, the operator performs the switching operation via the apparatus monitoring system (not shown) and, in the other way, the apparatus itself autonomously controls the switching by using the function such as GMPLS (Generalized Multi-Protocol Labeling Switch). Considering the flexibility in the switching function (to allow the path to be switched with no limitation on the wavelength), the output wavelength of the transponder may be switched using variable lasers in this exemplary embodiment by the remote operation under software control.

The order of switching control should be carried out with consideration for the function of an optical path. For example, to turn on the output of the transponder 119 in FIG. 3, the path of the optical switch 123 must be determined in advance. Turning on the output of the transponder 119 before determining the path of the optical switch 123 may cause deterioration in other signals.

In the description of the configuration in FIG. 2, the transponder 14 of the WDM apparatus 10 is newly used as a regenerative repeater by switching the path when a failure occurs. In addition to this usage, the transponder 14 may also be used as a transmitter/receiver when new services are provided (an optical path is established) with the WDM apparatus 10 as the starting point.

Figure 4:
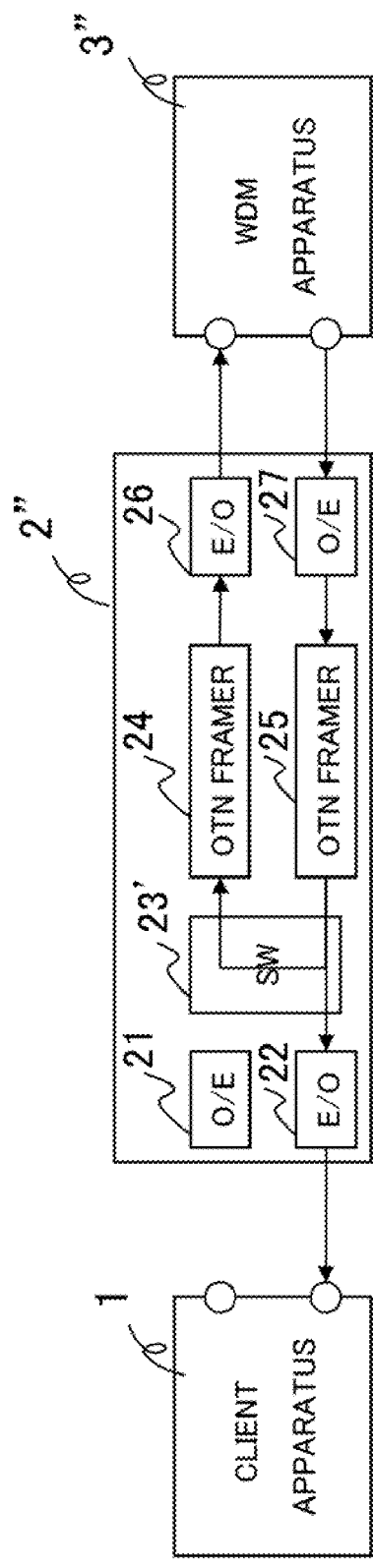
FIG. 4 is a diagram showing the configuration of a transponder in another exemplary embodiment of the present invention.

FIG. 4 is a diagram showing the configuration of another exemplary embodiment of the present invention. Referring to FIG. 4, a switch 23' of a transponder 2" loops back and connects the output of the OTN framer 25 to the input of the OTN framer 24 as shown in FIG. 1B and, at the same time, connects the output of the OTN framer 25 to the input of the electrical-to-optical converter 22 to provide the received signal into the client apparatus 1. Causing the switch 23' to select both the path to the client apparatus 1 and the loopback path to the WDM apparatus 3" allows the signal, which is output to the client apparatus 1, to be regenerated and repeated for output (multicasting) to the WDM apparatus 3". In this exemplary embodiment, both the reception of a multicast signal and the regenerative repeating for transmitting the received multicast signal downstream can be carried out by one transponder, whereas the reception of a multicast signal and the regenerative repeating of a multicast signal are conventionally carried out by two transponders.

As described above, this exemplary embodiment has the following effects.

In this exemplary embodiment, the transponder may be used in common for reception and for regenerative repeating. Using the transponder in common in this way reduces the cost required for purchasing standby transponders.

In this exemplary embodiment, a standby transponder, if installed in each WDM apparatus, allows the transponder to be used as a transmitter/receiver when the service must be started quickly, and as a regenerative repeater for path switching to bypass a failure when the transponder is not used as a transmitter/receiver.

In this exemplary embodiment, the ability to remotely set a transponder as a regenerative repeater and the ability to remotely change the path of an optical switch reduce the time for creating a new optical path when new services are started or when a path must be bypassed due to a failure, thus decreasing the operation manpower and ensuring the reliability of the apparatus through path switching.

The selection of both a path to a client apparatus and a loopback path to a WDM apparatus for receiving a multicast signal and for regenerative repeating for transmitting a multicast signal downstream direction, which is conventionally carried out by two transponders, one for each, may be carried out by one transponder in this exemplary embodiment.

The present invention is applicable to the function menu of a transponder in a WDM network and to the failure bypassing function in a WDM network.

All the disclosed contents of Patent Documents given above are hereby incorporated by reference into this specification. The exemplary embodiments and the examples may be changed and adjusted in the scope of all disclosures (including claims) of the present invention and based on the basic technological concept thereof. In the scope of the claims of the present invention, various disclosed elements may be combined and selected in a variety of ways. That is, it is to be understood that modifications and changes that may be made by those skilled in the art according to all disclosures, including the claims, and technological concepts are included.

What is claimed is:

1. A transponder, comprising:
a first optical-to-electrical converter that receives an optical signal, output from the client apparatus, and converts the received signal to an electrical signal;
a transmission unit that receives the electrical signal, output from the first optical-to-electrical converter, and produces a transmission signal for an optical transmission network;
a first electrical-to-optical converter that converts the transmission signal, output from the transmission unit, to an optical signal and delivers the converted optical signal to an input of a WDM (Wavelength Division Multiplexing) apparatus;

a second optical-to-electrical converter that receives an optical signal, output from the WDM apparatus, and converts the received optical signal to an electrical signal;

a reception unit that receives the electrical signal, output from the second optical-to-electrical converter, and produces a received signal;

a second electrical-to-optical converter that converts the received signal, output from the reception unit, to an optical signal, and delivers the converted optical signal to an input of the client apparatus; and a switch unit that changes over among a first connection state in which the output of the first optical-to-electrical converter is connected to the input of the transmission unit and the output of the reception unit is connected to the input of the second electrical-to-optical converter;

a second connection in which the output of the reception unit is loop-back connected to the input of the transmission unit; and a third connection state in which output of the reception unit is connected to the input of the transmission unit and the output of the reception unit is connected to the input of the second electrical-to-optical converter, a signal identical to a signal output by the reception unit and supplied via the second electrical-to-optical converter to the client apparatus being regenerated and repeated by the transmission unit for output to a destination WDM apparatus.

2. The transponder according to claim 1, wherein the WDM apparatus includes an optical switch connected to the transponder, the optical switch, together with the transponder, forming a WDM apparatus connected to a WDM network.

3. The transponder according to claim 2, wherein switching of the connection by the switch unit is set remotely via the WDM network.

4. A node apparatus, connected to a WDM network, comprising:

an optical switch that switches paths among WDM transmission lines; and one or a plurality of transponders, each as set forth in claim 1 and connected to the optical switch.

5. The node apparatus according to claim 4, wherein the transponder, which is connected to a client apparatus and has been functioning as a transmission and reception end that transmits an optical signal to the optical switch and receives an optical switch from the optical switch, has a function thereof switched to a regenerative repeating function, when a failure occurs on a path to which the node apparatus is connected, and is connected to a path, other than the path on which the failure occurred, by the optical switch.

6. A node apparatus comprising a plurality of transponders between an optical switch and a client apparatus, as a redundant configuration of a working transponder and a standby transponder, the plurality of transponders, each as set forth in claim 1, the optical switch switching paths among WDM transmission lines, wherein out of the transponders in the redundant configuration, the working transponder is connected to the client apparatus via a change-over switch.

7. The node apparatus according to claim 6, wherein the standby transponder functions as a transponder for regenerative repeating.

8. A WDM network system comprising a plurality of node apparatuses according to claim 4.

9. A regenerative repeating method for use in a WDM network, the method comprising:

providing on a node connected to a WDM (Wavelength Division Multiplexing) network, a transponder that is made switchable between a transmission/reception end function and a regenerative repeating function, the transponder as set forth in claim 1;

switching the function of a transponder on one node that has been functioning as a transmission/reception end to the regenerative repeating function, when a failure occurs on a path to which the one node is connected; and connecting the transponder to a path, other than the path on which the failure occurred, by an optical switch function in the one node.

10. The method according to claim 9, comprising:

providing a plurality of the transponders on the node in a redundant configuration, a working transponder out of the plurality of the transponders in the redundant configuration being connected to a client apparatus via a change-over switch.

11. The method according to claim 10, comprising making a standby transponder out of the plurality of the transponders function as a transponder for regenerative repeating.

12. The method according to claim 9, comprising setting remotely, via the WDM network, switching between the transmission/reception end function and the regenerative repeating function of the transponder.

* * * * *